(12) United States Patent
Semke et al.

(10) Patent No.: US 10,081,421 B2
(45) Date of Patent: Sep. 25, 2018

(54) PERCHING ATTACHMENT FOR UNMANNED AIRCRAFT

(71) Applicants: William Semke, Larimore, ND (US); Weston Swetich, Grand Forks, ND (US)

(72) Inventors: William Semke, Larimore, ND (US); Weston Swetich, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 204 days.

(21) Appl. No.: 15/080,265

(22) Filed: Mar. 24, 2016

(65) Prior Publication Data

US 2016/0280359 A1 Sep. 29, 2016

Related U.S. Application Data

(60) Provisional application No. 62/138,702, filed on Mar. 26, 2015.

(51) Int. Cl.

| | |
|---|---|
| *B64C 25/32* | (2006.01) |
| *B64C 27/00* | (2006.01) |
| *B64C 39/02* | (2006.01) |
| *B64C 27/10* | (2006.01) |

(52) U.S. Cl.
CPC ............ *B64C 27/006* (2013.01); *B64C 25/32* (2013.01); *B64C 27/10* (2013.01); *B64C 39/024* (2013.01); *B64C 2201/024* (2013.01); *B64C 2201/108* (2013.01); *B64C 2201/141* (2013.01); *B64C 2201/18* (2013.01)

(58) Field of Classification Search
CPC ....... B64C 27/006; B64C 27/10; B64C 25/32; B64C 39/024
See application file for complete search history.

(56) References Cited

U.S. PATENT DOCUMENTS

| | | | |
|---|---|---|---|
| 6,869,042 B2 | 3/2005 | Harrison | |
| 6,960,750 B2 * | 11/2005 | Doane | G02B 5/124 244/135 A |
| 7,335,067 B2 | 2/2008 | Lee et al. | |

(Continued)

FOREIGN PATENT DOCUMENTS

| | | |
|---|---|---|
| EP | 2517767 A2 | 10/2012 |
| EP | 2813428 A1 | 12/2014 |

(Continued)

OTHER PUBLICATIONS

J. F. Roberts, et al., "Energry Management for Indoor Hovering Robots", IROS 2008, 6 pages.

(Continued)

*Primary Examiner* — Justin M Benedik
(74) *Attorney, Agent, or Firm* — Kinney & Lange, P.A.

(57) ABSTRACT

An aerial vehicle system includes a flight system configured to generate propulsive force and lift, a protective framework, and an attachment mechanism secured to the protective framework and configured to selectively attach to a structure to provide stable perching of the aerial vehicle system. The attachment mechanism is an electro-permanent magnet device or a talon-like grip. The flight system is at least partially enclosed by the protective framework.

20 Claims, 7 Drawing Sheets

(56) References Cited

U.S. PATENT DOCUMENTS

| | | | |
|---|---|---|---|
| 7,398,946 | B1 | 7/2008 | Marshall |
| 7,410,125 | B2 | 8/2008 | Steele |
| 7,714,536 | B1 | 5/2010 | Silberg et al. |
| 8,251,307 | B2 | 8/2012 | Goossen |
| 9,139,310 | B1* | 9/2015 | Wang ............... B64F 1/36 |
| 9,156,565 | B2 | 10/2015 | Hachtmann et al. |
| 9,284,062 | B2* | 3/2016 | Wang ............ B60L 11/1809 |
| 9,285,222 | B2 | 3/2016 | Waite et al. |
| 9,387,928 | B1* | 7/2016 | Gentry ............. B64C 39/024 |
| 2010/0215212 | A1 | 8/2010 | Flakes, Jr. |
| 2010/0224723 | A1 | 9/2010 | Apkarian |
| 2014/0124621 | A1 | 5/2014 | Godzdanker et al. |
| 2014/0319272 | A1 | 10/2014 | Casado Magana et al. |
| 2014/0338323 | A1 | 11/2014 | Peyvandi et al. |
| 2015/0175276 | A1* | 6/2015 | Koster ................ B64F 1/32 244/114 R |
| 2016/0061186 | A1 | 3/2016 | Vander Lind et al. |

FOREIGN PATENT DOCUMENTS

| | | | |
|---|---|---|---|
| KR | 20130009893 | A | 1/2013 |
| SE | 516367 | C2 | 1/2002 |
| WO | WO2009/048666 | A2 | 4/2009 |
| WO | WO2009/074705 | A1 | 6/2009 |
| WO | WO2012/130856 | A1 | 10/2012 |
| WO | WO2013/055265 | A1 | 4/2013 |

OTHER PUBLICATIONS

H. Prahlad, et al., Abstract, "Electroadhesive robots—wall climbing robots enabled by a novel, robust, and electrically controllable adhesion technology", Robotics and Automation, IEEE International Conference, May 19-23, 2008, 2 pages.

A. N. Knaian, "Electropermanent Magnetic Connectors and Actuators: Devices and Their Application in Programmable Matter", Dept. of Electrical Engineering and Computer Science—Massachusetts Institute of Technology, Jun. 2010, 206 pages.

J. E. Auerbach, "The AirBurr Project", LIS Research Projects, from <http://lis2.epfl.ch/media/v/LIS_projects/AirBurr/>, Feb. 27, 2013, 3 pages.

A. Briod, et al., "The AirBurr: A Flying Robot That Can Exploit Collisions", International Conference on Complex Medical Engineering (CME), 2012 ICME, Kobe, Japan, 6 pages.

L. Daler, et al., "A Perching Mechanism for Flying Robots Using a Fibre-Based Adhesive", 2013 IEEE International Conference on Robotics and Automation (ICRA), Karlsruhe, Germany, May 6-10, 2013, pp. 4418-4423.

J. E. Auerbach, "GimBall Gallery", LIS Research Projects, from <http://lis2.epfl.ch/media/v/LIS_projects/GimBall/>, Oct. 30, 2013, 1 page.

B. Benchoff, "Electro-permanent Magnets for Quadcopters", from <http://hackaday.com/2013/07/12/electro-permanent-magnets-for-quadcopters/>, Jul. 12, 2013, 11 pages.

"Docking and berthing of spacecraft", from Wikipedia, Updated Mar. 17, 2015, 9 pages.

* cited by examiner

PERCHING ATTACHMENT FOR UNMANNED AIRCRAFT

CROSS-REFERENCE TO RELATED APPLICATION(S)

This application claims the benefit of U.S. Provisional Application No. 62/138,702 filed Mar. 26, 2015 for "Attachment for Robotic Operations Using Unmanned Aircraft" by William Semke and Weston Swetich.

BACKGROUND

The present invention relates to aerial vehicles such as unmanned aerial vehicles (UAVs), and more particularly to an attachment system and method for use with aerial vehicles.

While the use of UAVs continues to expand in size and scope, the potential functions that an UAV platform could perform in an industrial setting, for example, are underdeveloped. Industrial locations are usually large and contain a number of normally inaccessible spaces that cannot be reached without large expense, proper safety equipment, and extensive planning. Additionally, critical systems and structures are often a compact maze of pipes, beams, and wiring that might be operating in an environment unsuitable for direct human exposure.

However, there are limitations to the available power supply (e.g., a battery) on UAVs, which limits mission length when UAVs must hover to carry out mission objectives. Moreover, UAV operation in a hovering state can interfere with sensitive equipment carried by the UAV for mission objectives. Yet missions can involve a variety of terrain and require work to be performed in crowded areas, meaning that the UAV cannot simply land using conventional landing gear to perform operations at remote locations.

Therefore, it is desired to provide a UAV that is movable to remote locations, with on-board equipment and/or payloads, with an attachment system that allows for quick and easy perching (i.e., securing) of the UAV on a temporary basis at a remote site, to provide a stable and secure platform for desired operations at the remote site, while also allowing a reduction in power requirements over a mission envelope, particularly for battery-powered UAVs. In this way, a novel UAV attachment system according to the present invention can quickly and easily address the hazards and perform inspections and/or repairs at industrial facilities, for example, thereby decreasing downtime and easing logistical requirements. By reducing outages and downtime the system would have a great benefit to many industrial and public service entities.

SUMMARY

In one aspect, an aerial vehicle system according to the present invention includes a flight system configured to generate propulsive force and lift, a protective framework, and an attachment mechanism secured to the protective framework and configured to selectively attach to a structure to provide stable perching of the aerial vehicle system. The attachment mechanism is an electro-permanent magnet device or a talon-like grip. The flight system is at least partially enclosed by the protective framework.

In another aspect, a method of operating an aerial vehicle includes flying the aerial vehicle to a perching location, magnetically attracting the aerial vehicle to a perch with a permanent magnet magnetic field to create a perching engagement between the aerial vehicle and the perch, generating an opposing magnetic field, such that the opposing magnetic field cancels out at least a portion of the permanent magnetic field, and disengaging the aerial vehicle from the perch.

The present summary is provided only by way of example, and not limitation. Other aspects of the present invention will be appreciated in view of the entirety of the present disclosure, including the entire text, claims and accompanying figures.

Figure 1:
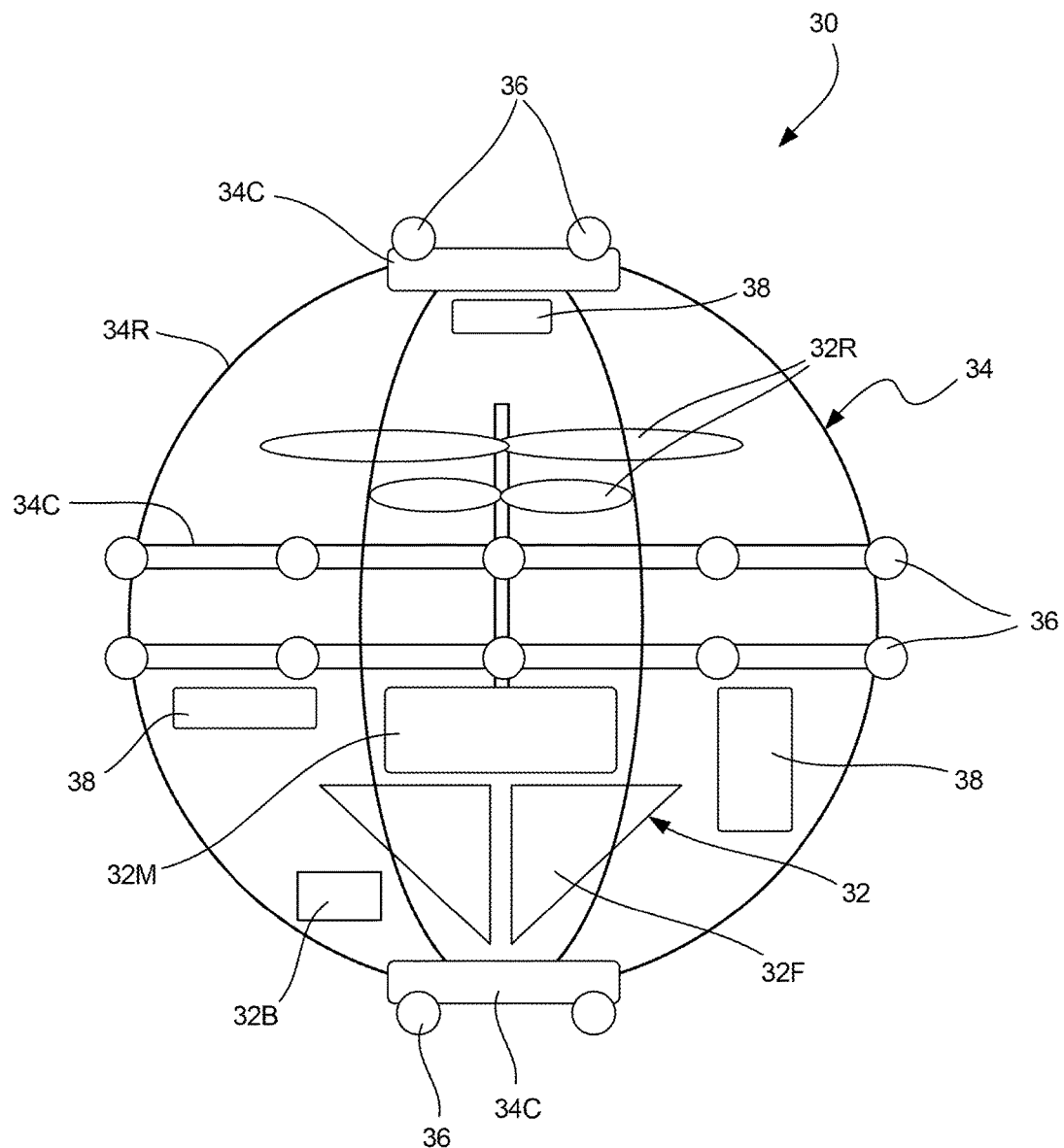
FIG. 1 is a schematic illustration of an embodiment of a UAV system according to the present invention.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present invention relates generally to a rigid attachment system that allows for rotor-type Unmanned Aerial Vehicles (UAVs) to land and attach to any surface in a stable configuration to perform local robotic operations at the site without use of the props and motors resulting in immense operational times. The inventive UAV can include a passive or semi-passive rigid attachment system as well as provide for collision resistant flight and operation, such as through the use of a cage or case to reduce or eliminate a risk of prop blade strikes during operation. Greater stability for robotic operations and inspections is produced with the implementation of the inventive attachment system. The elimination of air flow disturbances at the site, during on-site attachment when the prop blades are not rotating, also increases the effectiveness for multiple applications. The invention supports a wide variety of applications where a (temporarily) non-moving platform is essential for detailed operations.

This includes long duration surveillance and monitoring, performing material inspections, measuring air flow, changing light bulbs, and many other applications. This system allows for the "rigid", perched attachment of a rotor-type UAV at hard-to-reach/access location to perform robotic operations and the like. Complex, active docking or landing hardware, such as a robotic arm at a landing site that grabs and holds a UAV, is not required with the present invention—such complex devices may not be feasible for infrequent or unplanned missions, or simply may not be pre-installed at desired mission operation locations.

A primary benefit from the rigid mounting of a UAV is the tremendous reduction in power consumption over a life of a mission or missions. Most rotor-craft flight missions today have a flight time of 10 to 30 minutes after which the flight operations must be terminated due to battery power usage. With the rigid attachment system of the present invention, the operations time may be greatly extended up to several orders of magnitude. For instance, remote monitoring camera systems may use 750 mW of power, but even a small rotor craft may easily consume 75 W. Therefore, if the UAV can be securely attached at a desired location without using power for flight or attachment, mission times can easily go from minutes to hours or days.

Special considerations must be given to the design of an UAV platform for harsh and potentially dangerous procedures it may encounter. For instance, a coaxcopter design is well-suited for these environments as the stacked, counter-rotating rotors are internal to the vehicle structure eliminating the need for exceedingly large safety guards and the overall vehicle footprint is relatively compact. A quadcopter platform with comparable payload capacity requires a much larger footprint, and the inclusion of safety guards to protect spinning rotors from surrounding objects/persons and vice versa enlarges it further still, as well as reducing performance.

An aerial platform can easily survey a distant target, but for indoor applications the area of interest will typically be much closer and require more precision depending on the level of inspection needed. Hovering platforms are becoming increasingly stable, yet current stabilization software still exhibits drift and vibration inherent to spinning rotors which reduce performance in sensor measurements (see, e.g., FIGS. 7A and 7B, discussed further below). Eliminating or reducing both of these factors can be achieved with a method of rigid attachment at or near the inspection target area to allow a propulsion unit of the platform to be shut down.

A schematic illustration of an embodiment of a UAV system 30 is shown in FIG. 1. The illustrated embodiment of the UAV system 30 includes a flight system 32, a protective framework or cage 34, one or more attachment mechanisms 36, and one or more deployable systems 38 (e.g., sensors, robotic manipulators, payloads, and/or other devices).

The flight system 32 of the illustrated embodiment is capable of providing motive force (i.e., lift) and includes a power source 32B, such as one or more batteries, a motor and control subsystem 32M (which can optionally include one or more control flaps or ailerons 32F), and a plurality of blades (i.e., propellers, rotors or moving wings) 32R in a coaxial, counter-rotating arrangement. The motor and control subsystem 32M can include at least one electric motor as well as suitable control and/or communications circuitry, to allow for automated or semi-automated (e.g., man-in-the-loop) operation of the UAV system 30. For instance, the motor and control subsystem 32M can include a stabilizer subsystem for automated control and a wireless communication device to wirelessly transmit and receive data. As shown in FIG. 1 the motor and control subsystem 32M is statically fixed to the protective framework 34, and is located entirely within the protective framework 34. The power source 32B can provide power (e.g., electricity) to the motor and control subsystem 32M as well as to the attachment mechanism(s) 36, the deployable system(s) 38, and/or other on-board systems (not shown). The power source 32B can be located in a lower portion of the UAV system 30 (e.g., near an outer boundary of the protective framework 34), to provide a relatively low center of gravity to promote stable flight.

The flight system 32 can be encased in the protective framework 34 to help prevent blade strikes during operation, that is, to help prevent the blades 32R from contacting environmental objects during flight. The protective framework 34 defines an outer boundary. In the illustrated embodiment the protective framework 34 defines a spheroid-shaped cage enclosure formed by one or more connectors 34C and a plurality of elongate members or rods 34R. The connectors 34C can be any suitable mechanism for connecting the rods 34R to each other and/or to connect other structures to one or more of the rods 34R. The rods 34R can be carbon fiber tubes curved to define the spheroid-shaped cage, or other lightweight elements (e.g., other composites, metals, etc.). In further embodiments, the protective framework 34 can take other shapes, and nearly any desired number of rods 34R can be utilized. Although the illustrated embodiment includes connectors 34C forming polar and equatorial or near-equatorial mounting points or bands, other configurations are possible in further embodiments, such as with only one or two polar connectors 34C. The protective framework 34 also holds the attachment mechanisms 36 in a secure relationship relative to the flight system 32.

The attachment mechanism(s) 36 can provide a deployable attachment interface or supporting engagement between the UAV system 30 and a desired attachment point, such as at a remote location (i.e., remote from a takeoff location) at which the deployable system(s) 38 are desired to be used. Engagement of any of the attachment mechanisms 36 with a suitable surface or structure allows for in-situ operations (e.g., robotic operations, photography, etc.) to occur using the deployable system(s) 38 once the UAV system 30 is in the desired location. There are a number of possible passive and semi-passive attachment systems that can be utilized, such as the magnetic and mechanical attachment systems discussed further below. In general, the attachment mechanism(s) 36 are fixed to the UAV system 30 in an outward-facing arrangement, or are movable, actuatable, etc. to provide an operable condition that allows engagement with external surfaces or structures. As shown in the embodiment of FIG. 1, there are a plurality of attachment mechanisms 36, with multiple attachment mechanisms 36 at each of the opposite polar connectors 34C and multiple attachment mechanisms 36 can each of the equatorial or near-equatorial connectors 34C. Each of the attachment mechanisms 36 can be substantially identical, or alternatively the mechanisms 36 can have different configurations. For instance, the use of different attachment mechanisms 36 on the UAV system 30 can allow selection of a desired attachment modality for a given mission event, allowing the most effective attachment mechanism 36 to be utilized for a given landing or perching operation based on factors such as environmental topology, remaining power (of the power source 32B), health or operational state of the UAV system 30 (e.g., accounting for damage or wear to attachment mechanisms 36 or other components), deployment requirements (e.g., to orient the UAV system 30 such that the deployable system(s) 38 face a particular direction), and the like. In further embodiments, any desired number of attachment mechanism(s) 36 can be provided, including only a single mechanism. Electrical control wires can be directed along the protective framework 34, such as by wrapping wires around one or more of the rods 34R or threading wires through the rods 34R, in order to connect the attachment mechanism(s) 36 to the flight system 32 or other power and/or control components. Control of the attachment mechanism(s) 36 can be accomplished through integration with the control and/or communications circuitry of the motor and control subsystem 32M, or through separate and independent control and communication circuitry.

The particular layout of the attachment mechanism(s) 36 can be selected as desired for particular applications. For instance, in the illustrated embodiment there are multiple attachment mechanisms 36 on each of the connectors 34C of the protective framework, though in alternative embodiments there can be one or more mechanisms 36 on only selected connectors 34C, such as on only a single connector 34C. However, in general, the attachment mechanism(s) 36 are typically located at or near the outer boundary defined by the protective framework 34. For example, one or more attachment mechanisms 36 can be fixedly secured to each of the connectors 34C such that the mechanisms 36 are located at the outer boundary defined by the protective framework 34 or protrude beyond the outer boundary. Alternatively, the attachment mechanisms 36 can be deployable, such that in a stowed or non-operational condition a given attachment mechanism 36 is at or inside the outer boundary and in a deployed or operational condition extends to or beyond the outer boundary. Regardless of the particular configuration, the attachment mechanisms 36 can generally distinguishable from payload carrying devices that attach payloads onboard the UAV system 30 in that the attachment mechanisms 36 face or can be deployed to face external, environmental structures to enable perching, and the attachment mechanisms 36 are capable of supporting the entire UAV system 30 as opposed to merely a payload. In operation, the attachment mechanism(s) 36 can engage an environmental object or surface and support the entire UAV system 30 in a perched condition for an indefinite period of time. Typically, only a single attachment mechanism 36 must be engaged at any time to support the UAV system 30, however, in further embodiments multiple attachment mechanisms 36 can be engaged concurrently to provide mutually-assisted support.

Important to mission success are the deployable system(s) 38 that the UAV system 30 carries, which can be operational during both flight operations and at the deployed locations (e.g., when landed or perched). The deployable system(s) can each be sensors/transducers, robotic manipulators, payloads, and/or other devices. For instance, a robotic arm or manipulator can be provided that can extend to locations outside or beyond the outer boundary of the protective framework 34, and can optionally be retractable to fit entirely within the outer boundary in a stowed position. In one embodiment, the deployable system(s) 38 includes a sensor configured as a camera (e.g., a digital camera with both video and still image capabilities) engaged with the flight system 32 and operable in an automated, semi-automated or manual manner, with a field of view that encompasses one or more gaps in the protective framework 34 (e.g., between the rods 34R) to include a surrounding environment. Control of the deployable system(s) 38 can be accomplished through integration with the control and/or communications circuitry of the motor and control subsystem 32M, or through separate and independent control and communication circuitry. In the illustrated embodiment of FIG. 1, multiple deployable systems 38 are provided, and each is located within the outer boundary of the protective framework 34 so as to be protected from impact during operation of the UAV system 30. A given deployable system 38 can be engaged directly to the flight system 32, the protective framework 34, or other suitable structures of the UAV system 30. Significantly, the deployable system 38 is usable both in flight and when the UAV system 30 is perched or landed at a given location.

Figure 2:
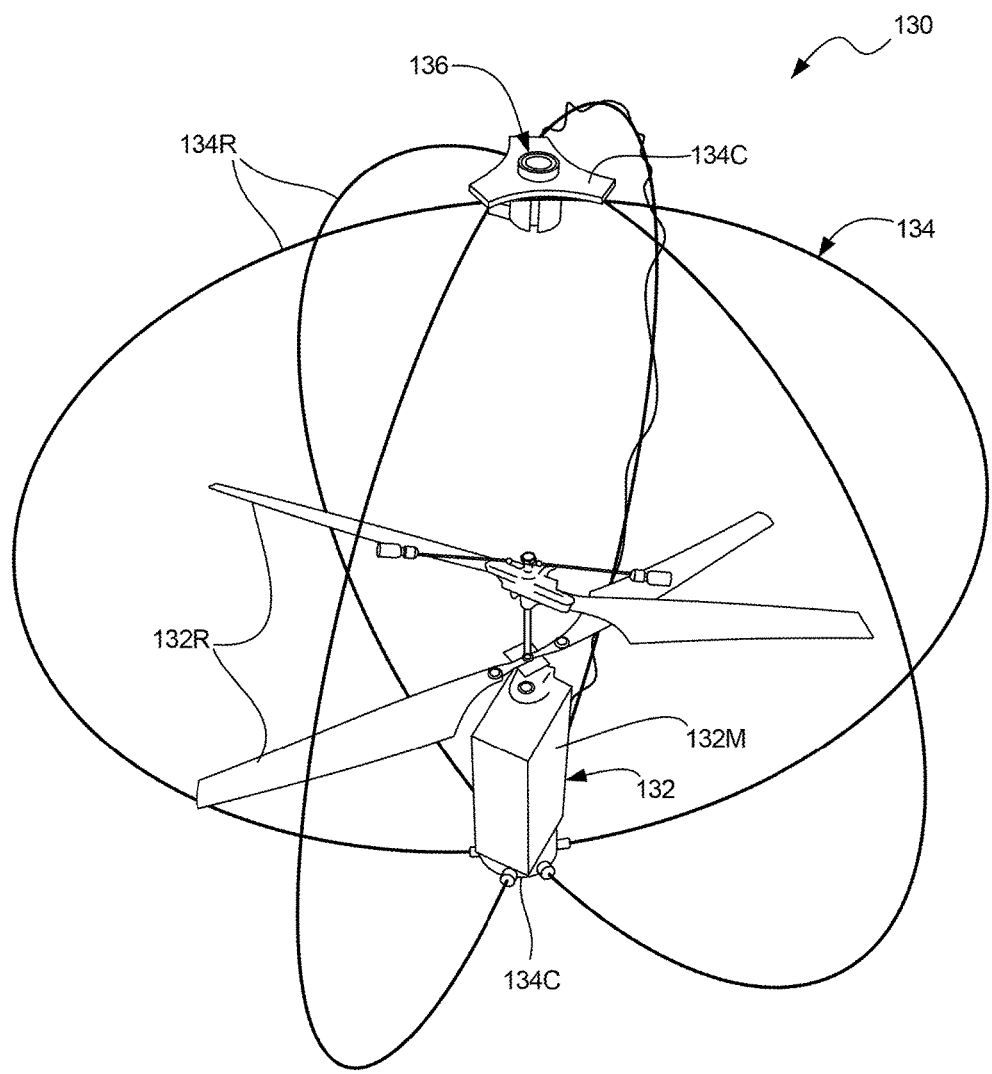
FIG. 2 is a perspective view of another embodiment of a UAV system according to the present invention.

FIG. 2 is a perspective view of another embodiment of a UAV system 130, which includes a flight system 132 (having a motor and control subsystem 132M, blades 134R and a power source that is not distinctly visible in the figure), a protective framework or cage 134 (having connectors 134C and rods 134R), an attachment mechanism 136, and a deployable camera system that is not distinctly visible in the figure. The UAV system 130 can be configured to operate in a manner similar to that of the UAV system 30 described above.

The attachment mechanism 136 of the UAV system 130 is located at an upper pole (i.e., a location above or proximate the rotors 132R and opposite the motor and control subsystem 132M) of an outer boundary defined by the protective frame 134, and secured to one of the connectors 134C. In the illustrated embodiment, the connector 134C at the upper pole has a triangular profile along the outer boundary, such that the rods 134R can be secured in a spaced relationship to give the outer boundary a spheroid shape. The rods 134R of the protective frame 134 provide both protection for the blades 132R, etc., but also can provide the sole structural support for the upper pole connector 134C and the attachment mechanism 136 relative to the flight system 132. The attachment mechanism 136 extends to the outer boundary, and protrudes inward relative to the protective framework 134 toward the fight system 132. The attachment mechanism 136 is an electro-permanent magnet device, which is described further below. Control wires operably connecting the attachment mechanism 136 and the flight system 132 are wound around one of the rods 134R. The electro-permanent magnet attachment mechanism 136 permits the UAV system 130 to engage, for instance, any ferromagnetic material or a paramagnetic material, and to suspend the UAV system 130 from an upper or overhead perching location.

Figure 3:
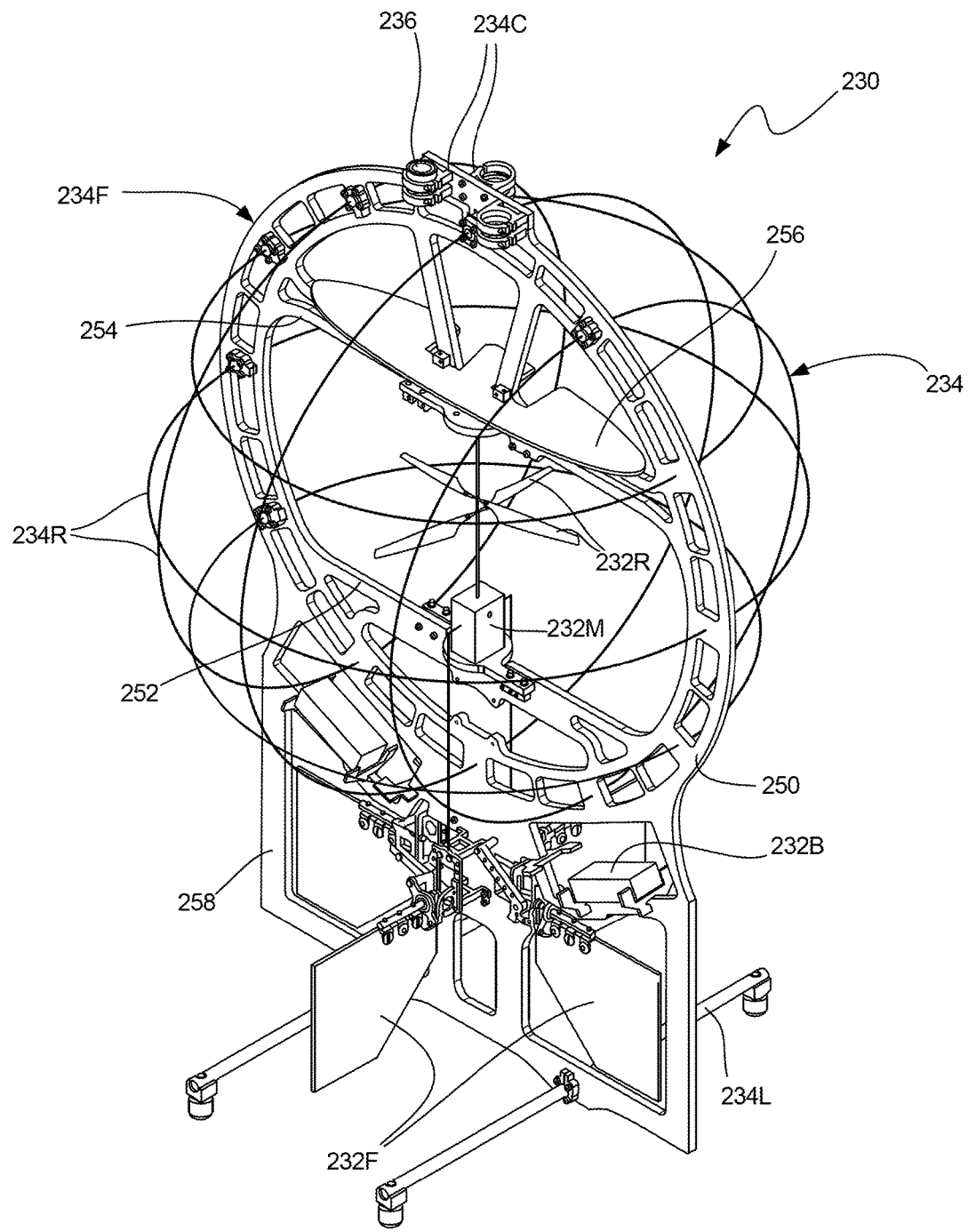
FIG. 3 is a perspective view of another embodiment of a UAV system according to the present invention.

FIG. 3 is a perspective view of another embodiment of a UAV system 230, which includes a flight system 232 (having a power source 232B, control flaps 232F, a motor and control subsystem 232M, and blades 232R), a protective framework or cage 234 (having connectors 234C, frame 234F, landing gear supports 234L, and rods 234R), and an attachment mechanism 236. A deployable system can also be provided with the UAV system 230 that is not shown in FIG. 3. It should also be noted that the flight system 232 is shown in a simplified manner in FIG. 3. The UAV system 230 can be configured to operate in a manner similar to that of the UAV systems 30 and/or 130 described above. However, the UAV system 230 is configured to support a greater overall carrying capacity for larger on-board componentry and a more powerful flight system. For instance, control flaps (or ailerons) 232F can be provided to allow flight control where the motor and control subsystem 232M and/or the blades 234R are too large to reasonably permit the use of integrated stability control mechanisms.

The frame 234F of the protective framework 234 can be configured as a single substantially flat panel, which can be made of a cellular (e.g., honeycomb) sandwich panel made of carbon-fiber reinforced composite material and can be oriented substantially vertically (or essentially parallel to a rotational axis of the blades 232R). The sandwich panel can be cut out to form the frame 234F in a desired shape. In the illustrated embodiment the frame 234F includes an annular truss 250, which adjoins a substantially spheroid-shaped outer boundary defined principally by rods 234R of the protective framework 234, and supports 252 and 254. The supports 252 and 254 can extend across an inner (e.g., central) opening of the truss 250, and can provide mounting points for the motor and control subsystem 232M, etc. In the illustrated embodiment, the motor and control subsystem 232M and the blades 232R can be secured to both of the supports 252 and 254. A shelf 256 can optionally be provided on the upper support 254 to provide a location to attach navigation system components or other items. Furthermore, the frame 234F can further optionally include a lower portion 258, which can extend outside the substantially spheroid-shaped outer boundary of as defined principally by rods 234R of the protective framework 234. The lower portion 258 can include openings to accommodate at least some of the flaps 232F, at least a portion of the power source 232B (e.g., one or more batteries), and other components, as well as purely mass-reducing cutouts. The landing gear supports 234L can also be attached to the lower portion 256.

The rods 234R can be connected to or pass through the frame 234F. Unlike the embodiment of the UAV system 130, the frame 234F can carry all or substantially all of the structural load of the UAV system 230, such that the rods 234R provide only collision protection.

The connector 234C at an upper pole of the protective framework 234 includes a plurality of support locations to attach an array of multiple attachment mechanisms 236 and/or other structures (e.g., deployable systems). Use of multiple attachment mechanisms 236 concurrently may be desired where the UAV system 230 is relatively large and/or heavy. It should be noted, however, that the location of the attachment mechanisms 236 at the upper pole is shown merely by way of example and not limitation.

Figure 4A:
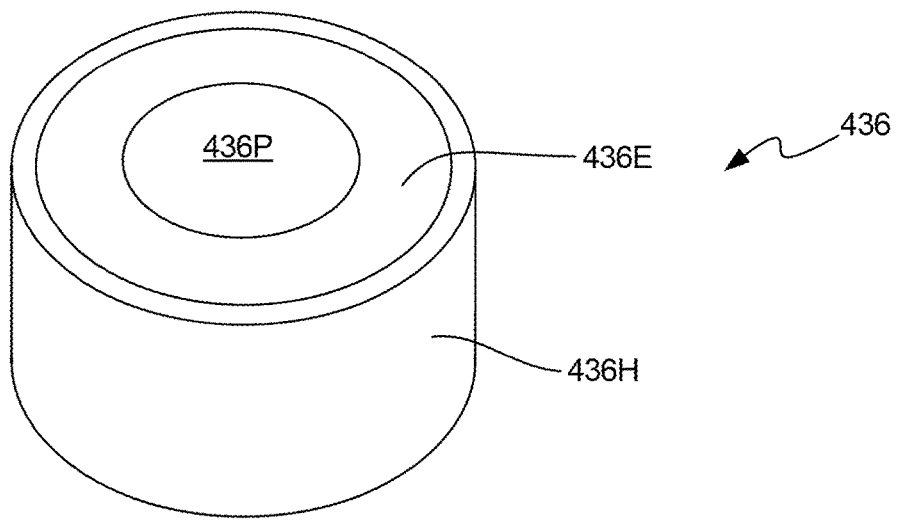
FIG. 4A is a perspective view of an embodiment of a magnetic attachment mechanism for use with the UAV system.

FIG. 4A is a perspective view of an embodiment of a magnetic attachment mechanism 436 for use with any embodiment the UAV system 30, 130 or 230. In the illustrated embodiment, the magnetic attachment mechanism 436 is an electro-permanent magnet that includes a permanent magnet 436P (e.g., a rare Earth permanent magnet) and an electromagnet 436E, which can be configured as an electromagnetic coil surrounding the permanent magnet 436P and potted in a housing 436H. The housing 436H can have a generally cylindrical shape. In further embodiments the magnetic attachment mechanism 436 can have a different configuration, such as with multiple permanent magnets 436P, multiple electromagnets 436E, etc. Moreover, suitable magnetic shielding can also be used to isolate the magnetic attachment mechanism 436 from other portions of the UAV system 30, 130 or 230.

The permanent magnet 436P provides a passive magnetic field that, in turn, passively provides a constant or permanent holding force to attach a UAV system 30, 130 or 230 to a ferrous metallic surface or structure at a perching location. A perching attachment can be provided simply by maneuvering the magnetic attachment mechanism 436 into close proximity to the desire perching location such that the magnetic field of the permanent magnet 436P attracts the ferrous metallic surface or structure at the perching location. The magnetic field of the permanent magnet 436P does not require any power, and therefore does not deplete limited on-board power resources during a UAV mission. The magnetic attachment mechanism 436 results in zero power requirements while attached to hold the UAV system 30, 130 or 230 rigidly in place for deployable system operations.

In order to release the attachment mechanism 436, the electromagnet 436E is temporarily activated, counteracting or negating the holding force provided by the magnetic field of the permanent magnet 436P to allow detachment of the UAV 30, 130 or 230 from the perching location. During flight, the electromagnet 436E can also be powered, as desired, to counteract or negate the magnetic attractiveness of the permanent magnet 436P, or can be mechanically stowed (e.g., with a cover, turned to face inward, etc.) so that the permanent magnet and associated permanent magnet magnetic field would not inadvertently come in contact with surrounding materials.

Furthermore, when performing a perching operation to attach the magnetic attachment mechanism 436 to a desired perching location, the electromagnet 436E can be temporarily powered to generate an auxiliary magnetic field that bolsters (i.e., augments) the magnetic field of the permanent magnet 236P, to provide greater magnetic flux while the UAV system 30, 130 or 230 is still in flight or otherwise still undergoing the perching operation and potentially still moving (e.g., rocking, swaying, etc.) before settling to a complete rest. When perched and at rest, the electromagnet 436E can be powered off to discontinue the auxiliary magnetic field. Optionally, the electromagnet 436E can be selectively powered on (and even cycled on and off as desired) while the UAV system 30, 130, 230 remains perched, such as to temporarily increase holding/attachment force with an auxiliary magnetic field during particular deployable system operations (e.g., using actuators that might tend to move the UAV), during transient environmental events (e.g., high winds, attacks by other vehicles or persons, etc.).

One advantage of the magnetic attachment mechanism 436 is that an ability to engage and disengage even soft surfaces, such as magnetically active perch materials that are covered with soft materials (e.g., foam, organic matter like leaves, etc.) that may limit the effectiveness of mechanical attachment and/or detachment mechanisms. Another advantage is that the magnetic attachment mechanism 436 operates on purely electromagnetic principles and has no moving parts.

Additional discussion of the method of operation of the magnetic attachment mechanism 436 is provided below with respect to the discussion of FIG. 6.

Figure 4B:
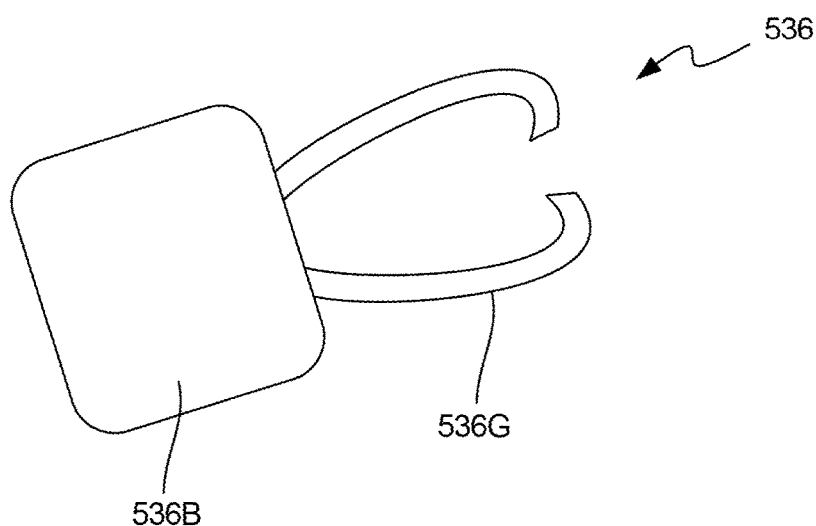
FIG. 4B is a perspective view of an embodiment of a mechanical attachment mechanism for use with the UAV system.

FIG. 4B is a perspective view of an embodiment of a mechanical attachment mechanism 536 for use with any embodiment the UAV system 30, 130 or 230. The mechanical attachment mechanism includes a talon-like gripping mechanism with one or more talon- or hook-shaped grips 536G and a base 536B. The talon-shaped grip(s) 536G can be made of a resilient material that can deflect to engage a perching surface or structure, and with the shape of the talon-like grip 536G providing a claw-like grip that resists disengagement. There can be two opposed talon-like grips 536G, as shown in the embodiment of FIG. 4B, one talon-like grip 536G opposed to a non-talon-shaped structure, or arrays of more than two talon-like grips 536G. Moreover, the talon-like grips 536G can instead be arranged to face away from each other, to engage crevices and the like in environmental structures. Using talon grips 536G, the perching attachment surface or structure would not have to be a ferrous material (as with magnetic attachment mechanism 436), but would have to have a surface or shape the talon-like grip(s) 536G could hold onto. In one embodiment, the talon-shaped grips 536G can have a spring loaded configuration in which the talon-shaped grips 536G are activated/powered to open (e.g., move apart from each other) with a suitable motor or other powered mechanism and when unpowered the spring would bias the talon-shaped grips 536G to a closed/engaged position (e.g., move toward each other) to provide a gripping force. So to detach the UAV system 30, 130 or 230 from a given structure at the perching location, the talon-like grips 536G would be activated to open and thereby release the UAV system 30, 130 or 230. Suitable attachment surfaces/structures include planar surfaces with exposed edges, poles, and non-uniform surfaces.

Other bio-mimicry mechanisms, such as synthetic setae (resembling gecko toe pads) or "shark bite" grips, can be used in further embodiments. Moreover, releasable adhesives can be utilized in alternate embodiments, or in conjunction with other attachment mechanisms. Additional alternative attachment mechanisms include suction-type mounts or some form of hook-and-loop-like materials (e.g., Velcro®) that could removable adhere to a variety of surfaces.

Moreover, other specialty mounting hardware mounted in locations of frequent attachment could have a large advantage. In other words, a mechanical interlock system can be provided with a dedicated structure (i.e., a dedicated "perch") installed at a desired remote location and the UAV attachment mechanism including suitable mating hardware that can reliably engage and interlock with the structure at the remote location. For instance, a ball-and-socket or other mechanical connection joint would provide very secure mounting at precise locations. This type of configuration would be effective in locations that will have to be assessed often or may need a very strong connection for robotic operations.

The UAV system 30, 130 or 230 can include one or more of the attachment mechanisms described above. For instance, in one application, multiple instances of a given type of attachment mechanism (e.g., talon-like grips) can be installed in an array on the framework of the UAV system 30, 130 or 230, such that the UAV system 30, 130 or 230 can engage a variety of surfaces/structures in a variety of orientations. Alternatively, or in addition, multiple types of attachment mechanisms can be installed on the UAV system 30, 130 or 230, thereby allowing adaptability in attachment to an even wider variety of surfaces/structures, with the particular mechanism selected as a function of characteristics of the desired attachment location. Redundant attachment capabilities can also be utilized.

Figure 5:
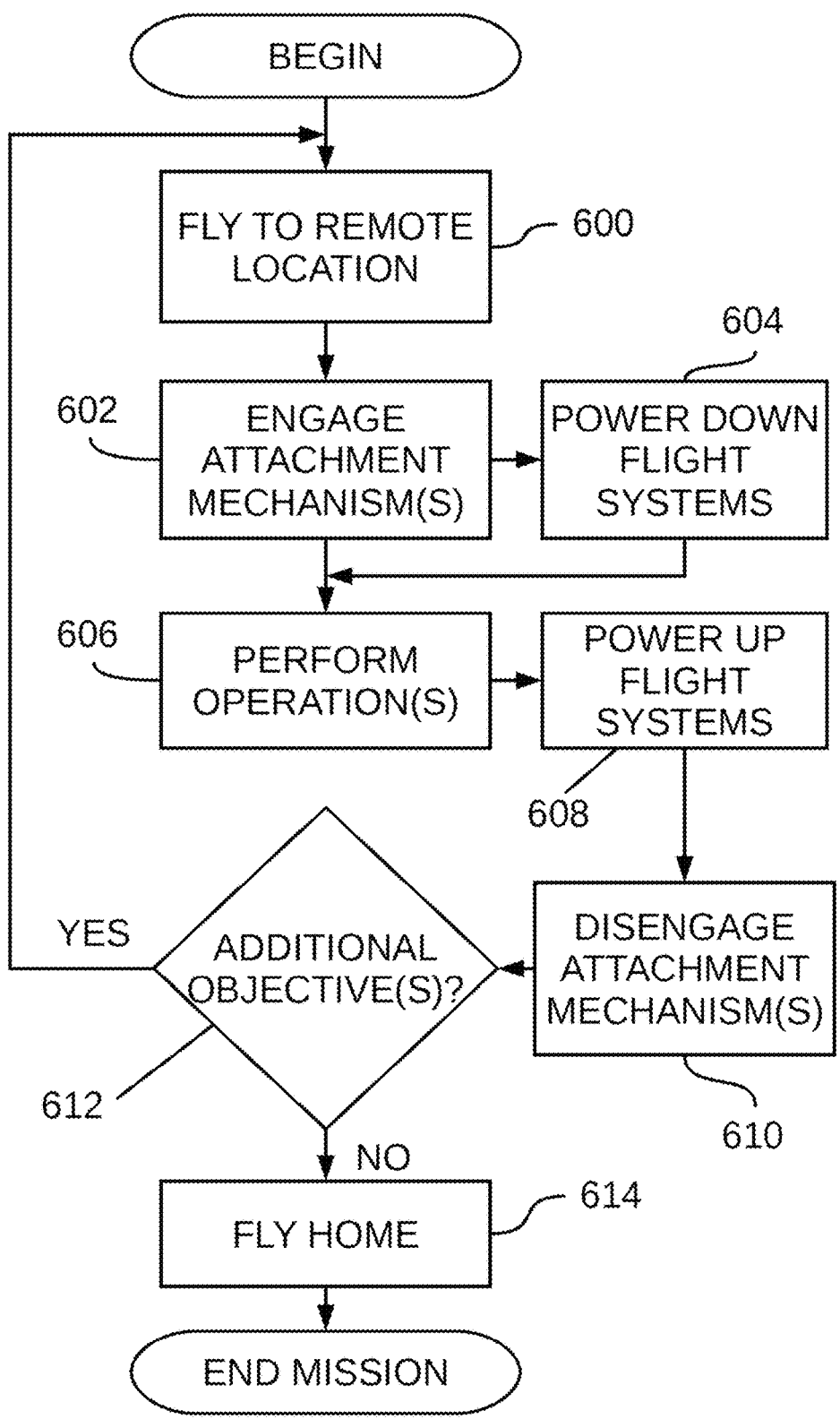
FIG. 5 is a flow chart of a method of operating a UAV system according to the present invention.

FIG. 5 is a flow chart of a method of operating a UAV, such as the UAV systems 30, 130 and 230 described above. The method can include flying the UAV to a desired remote location from a current position, such as a home base or other location (step 600). Upon reaching the remote location, one or more attachment mechanisms are engaged to one or more local surfaces or structures at the remote location (step 602). Engagement of the attachment mechanism(s) can produce a stable and essentially rigid "perched" engagement, that is, an engagement capable of supporting the entire mass of the UAV. It should further be noted that the "perched" engagement can support the UAV in a manner other than with conventional landing gear, such as by supporting the UAV from one or more attachment mechanisms located on a side or top of the UAV rather than with landing gear typically located at the bottom or underside of the UAV (although perching attachment mechanisms can also be located at the bottom or underside of the UAV). For instance, the perched engagement can be on a wall, overhang, small perch or other irregular surface or object rather than on a relatively large, flat, horizontal landing pad or the ground. In one embodiment, the attachment mechanism can remain passive, that is unpowered, once engaged, for an indefinite period of time. Once the attachment mechanism(s) are engaged, some or all of the flight systems (e.g., the flight system 32, 132 or 232) can be powered down to a low power mode, such as being turned off completely or placed in a sleep/hibernation mode (step 604). When the flight systems are powered down, the UAV can be supported entirely by the attachment mechanism, without hovering and without use of rotating blades to provide lift. In other words, the rotor blades can be idle in the low power mode when the UAV is supported entirely by the attachment mechanism. One or more operations can then be performed at the remote location using one or more onboard deployable system(s) (while the attachment mechanism(s) are engaged and while at least one flight system is powered down) (step 606). Upon completion of the operation(s), flight systems can be powered up (step 608) and the attachment mechanism(s) disengaged (step 610). It can then be determined if there are additional mission objectives (step 612). If there are additional mission objectives at other locations, the method can return to the step 600 to fly to a different desired remote location. If there are no additional mission objectives, the UAV can fly home (to any desired mission termination location) (step 614) and the mission can end.

It should be understood that the method as illustrated in FIG. 5 and described above is provided merely by way of example and not limitation. For instance, additional steps not specifically shown or described can be performed in conjunction with the method, such as by further performing one or more operations using an onboard deployable system while the UAV is in flight.

Figure 6:
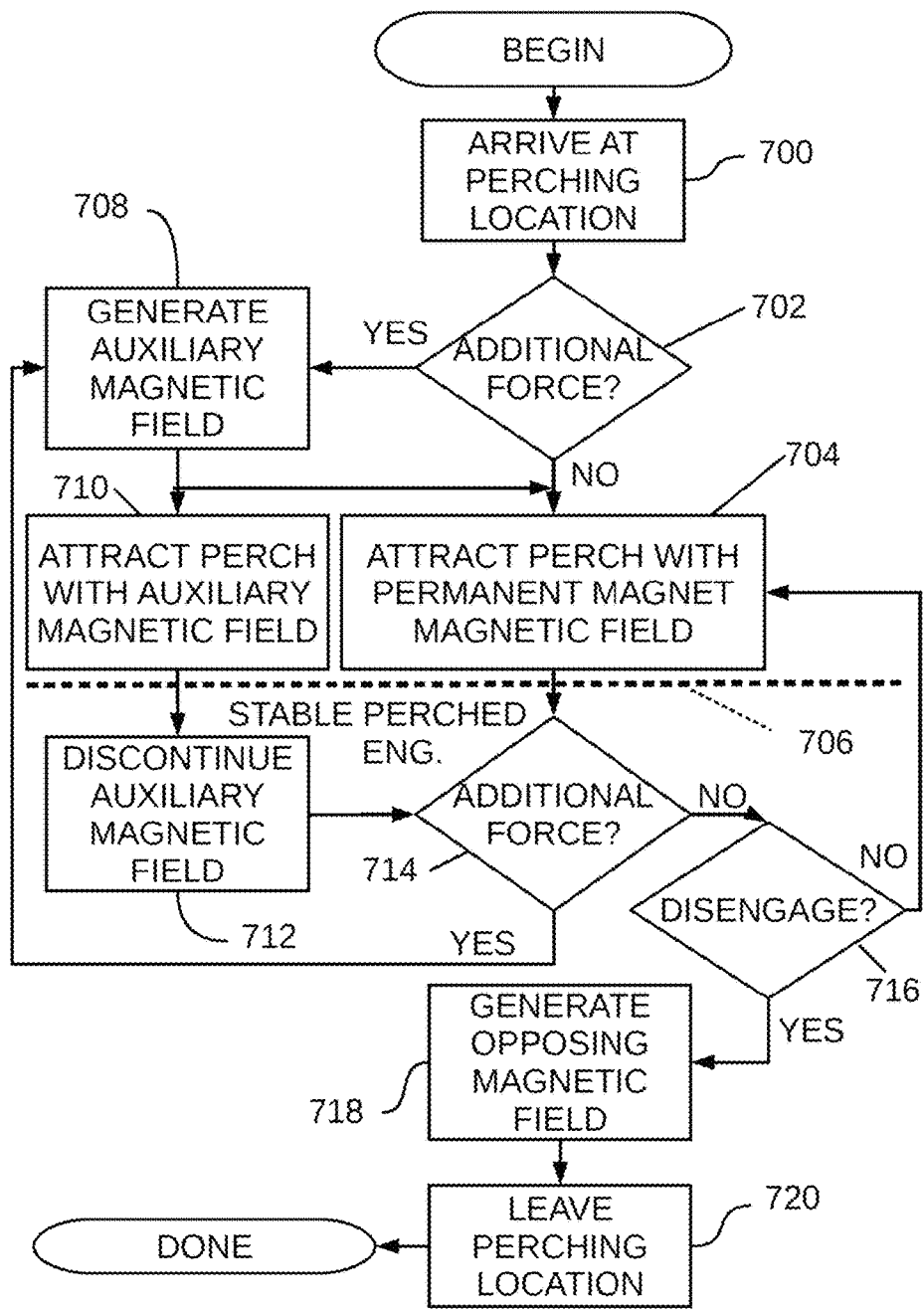
FIG. 6 is a flow chart of a method of operating the magnetic attachment mechanism of the UAV system.

FIG. 6 is a flow chart of a method of operating the magnetic attachment mechanism 436 with any embodiment of the UAV system 30, 130 or 230. The method of FIG. 6 can be utilized in conjunction with the method of FIG. 5, or in other contexts.

In the embodiment of the method of FIG. 6, a UAV initially flies along a suitable flight path and arrives at a desired perching location (step 700). The desired UAV perching location can be selected as desired for a particular mission. For instance, if a surveillance or monitoring action is part of a mission, the desired UAV perching location may be close to a target such that the target is within a field of view of a camera or field of operation of another deployable surveillance/monitoring device carried by the UAV. There may be significant maneuvering required to reach the desired perching location, as well as to approach the desired perching location with a suitable orientation of the UAV (e.g., such that an onboard deployable device faces a desired direction while an attachment device also faces a desired direction). Upon arriving at the desired perching location, it is contemplated that some amount of hovering may be performed by the UAV while preparing for subsequent perching steps. For example, step 700 can further include optional surveillance of the desired perching location and/or the surrounding environment while the UAV is hovering or in flight, in order to gather data useful for determining how to implement subsequent method steps for perching operations.

It is further noted that the magnetic attachment mechanism utilized in the present embodiment requires a perch made, at least in part, of a material that is ferromagnetic or paramagnetic, that is, the perch material must be able to be attracted by a magnetic field. If no such magnetically active perch material is available, then a new perch location must be selected or a different attachment mechanism of the UAV utilized, if available. Therefore, surveillance of the desired perching location upon arrival may further include testing for magnetic properties of the perch location.

Next, a determination is made as to whether additional magnetic attachment force is desired for the perching operation (step 702). In this context, additional magnetic attachment force refers to force in addition to a default force provided by the magnetic attachment mechanisms intended to be used (e.g., the default magnetic field strength of one or more permanent magnets of given the magnetic attachment mechanisms). Such a determination can be premised on the nature of the desired perching location, such as the degree of magnetic attractiveness of materials at the desired perching location, surface area and geometry of the desired perching location, etc., as well as environmental factors such as wind speed & direction, temperature, the presence of moisture or other materials (e.g., friction-reducing materials such as oils) at the desired perching location, etc.

If no additional perching force is desired at step 702, then the method can proceed to step 704. At step 704, one or more permanent magnets of the magnetic attachment mechanism of the UAV attract the material of the perch at the desired perching location with the magnetic field of the permanent magnet(s), in order to create a perching engagement. The attraction between the permanent magnet(s) of the magnetic attachment mechanism and the perch brings those structures into physical contact with each other in such a manner as to provide a stable, secure and rigid engagement that can support the entire UAV on or from the perch. The point at which the magnetic attachment mechanism achieves stable, secure and rigid engagement with the perch such that the UAV is perched and fully supportable by the magnetic attachment mechanism (and optionally in conjunction with other attachment mechanisms operating concurrently with the magnetic attachment mechanism) is designated as point 706 in FIG. 6. The permanent magnet(s) of the magnetic perching mechanism can fully support the entire UAV without requiring active power resources. It is contemplated that a given perching operation may fail or begin to fail at step 704, in that conditions may disrupt a perching operation before stable perching at point 706 is achieved, in which case the method can return to either step 700 or step 702.

If additional perching force is desired at step 702, then the method can proceed to step 708. At step 708, one or more electromagnets of the magnetic attachment mechanism of the UAV generate at least one auxiliary magnetic field. Typically, the auxiliary magnetic field generated at step 708 is configured to bolster (i.e., augment) the magnetic field of the permanent magnet(s) of the magnetic attachment mechanism. A magnitude of the auxiliary magnetic field can be selected as desired to produce a suitable overall (net) attracting force, and can optionally be limited to conserve available power resources on board the UAV. However, in instances in which the perch material (or adjacent an adjacent material) is magnetized in such a way that repels the permanent magnet(s) of the magnetic perching mechanism (i.e., in a bucking relationship), the auxiliary magnetic field can be generated in an opposite polarity to the permanent magnetic field but at a greater magnitude (to overcome any offsetting of the opposing magnetic fields) in an alternate embodiment of the method. Once the auxiliary magnetic field is generated, the magnetic attachment mechanism of the UAV attracts the material of the perch with the auxiliary magnetic field (step 710). Step 710 can happen concurrently with step 704, such that both the auxiliary magnetic field and the permanent magnet magnetic fields are active to produce a net magnetic field (as noted above, the auxiliary magnetic field typically bolsters the permanent magnet magnetic field) that collectively attracts to the perch material. The attraction between the permanent magnet(s) and electromagnet(s) of the magnetic attachment mechanism and the perch brings those structures into physical contact with each other in such a manner as to provide a stable, secure and rigid engagement that can support the entire UAV on or from the perch. As previously noted, the point at which the magnetic attachment mechanism achieves stable, secure and rigid engagement with the perch such that the UAV is perched and fully supportable by the magnetic attachment mechanism (and optionally in conjunction with other attachment mechanisms operating concurrently with the magnetic attachment mechanism) is designated as point 706 in FIG. 6. When the auxiliary magnetic field is no longer desired, which typically is after stable perching at point 706 has been achieved, the generation of the auxiliary magnetic field can be discontinued (step 712). Generating the auxiliary magnetic field on a temporary basis allows for increased net magnetic attraction to the perch leading to stable perching, while allowing reduced (if not zeroing) power requirements during perching.

After stable perching has been achieved at point 706, the UAV can remain perched indefinitely. As discussed above, such as with respect to the method of FIG. 5, the UAV can perform desired objectives while perched, and a flight system of the UAV can be powered off or placed in a sleep mode such that rotor blades stop spinning. There may, however, be limited times during perching in which additional perching holding force is desired, such as due to wind gusts, malicious attacks, etc., due to use of deployable systems that generate significant forces on the UAV (e.g., robotic arm operations), or due to the perched attachment of the UAV becoming or likely becoming unstable for any reason. Therefore, a decision can be made as to whether additional magnetic attachment force is desired while still at least nominally perched (step 714). If additional force is desired, the method can return to step 708. If no additional force is desired, perching can be maintained by the permanent magnet(s) of the magnetic attachment mechanism alone. It is possible to provide additional perching holding force periodically or intermittently, and at any desired magnitude.

A decision can be made as to whether to disengage the magnetic attachment mechanism and de-perch the UAV (step 716). If continued perching is desired, the method essentially returns to step 704. When it is desired to de-perch the UAV, the flight system of the UAV can be powered on (if previously deactivated) in anticipation of departure, and the electromagnet of the magnetic attachment mechanism can generate an opposing magnetic field that can effectively cancel out the magnetic field(s) of the permanent magnet(s) (step 718). A magnitude of the opposing magnetic field can be selected to reduce the net magnetic field of the magnetic attachment mechanism to zero or nearly zero, or to any desired reduced level. The partial or full cancellation of the magnetic field(s) of the permanent magnet(s) with the opposing magnetic field of the electromagnet thus constitutes active cancellation of the magnetic field(s) of the permanent magnet(s). The UAV can then generate lift with the flight system and leave the perching location (step 710).

Additionally, during steps 700 and/or 720, when the UAV is in flight or hovering, an opposing magnetic field can be generated with the electromagnet of the magnetic attachment mechanism to effectively cancel out the permanent magnet magnetic field. In this way, a risk of inadvertent attraction of the permanent magnet(s) of the magnetic attachment mechanism can be reduced or eliminated. Alternatively, other mechanisms such as stowing or shielding the magnetic attachment mechanism during flight or hovering can be performed.

EXAMPLE

Figure 7A:
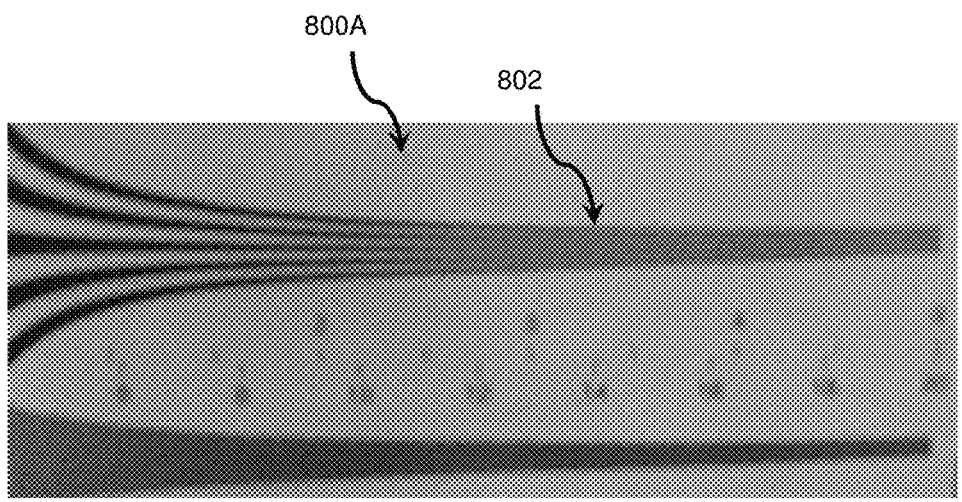
FIG. 7A is a portion of a photographic image of a resolution chart taken by a camera carried by the UAV system while perched.
Figure 7B:
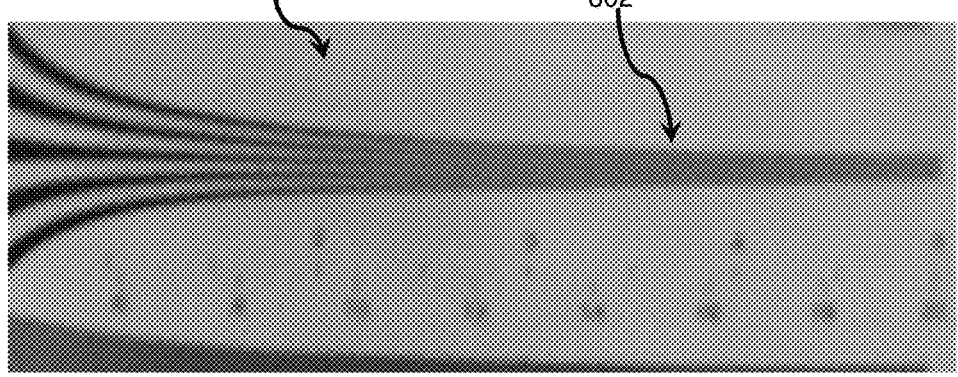
FIG. 7B is a portion of a photographic image of the resolution chart taken by the same camera carried by the same UAV system while in flight.

Tests of prototype UAVs according to the present invention were performed. In particular, resolution studies were also conducted to illustrate the ability of UAV systems according to the present invention to capture fine details when in the perched configuration and during flight. FIG. 7A is a portion of a photographic image 800A of a resolution chart taken by a camera carried by the UAV system 130 while perched, and FIG. 7B is a portion of a photographic image 800B of the same resolution chart taken by the same camera carried by the same UAV system 130 while in flight. The camera was a digital camera available from GoPro, Inc., San Mateo, Calif. FIGS. 7A and 7B show the greater level of detail that can be captured by a camera carried onboard the UAV 130 while in a stable perched position compared to in flight. The motion of the UAV 130 as well as the vibration created by the motor and control system 132 including the blades 132R create the blur in the images. In FIG. 7A, taken while perched, individual lines are discernable all the way to the right on a target 802 of the resolution chart. In FIG. 7B, taken while in flight, the individual lines of the target 802 of the resolution chart are not discernable past approximately half-way across the target 802. This represents is an increase of 2-times the resolution while the UAV is perched rather than in flight. This will provide much greater abilities to discern objects, conduct detailed studies of imagery, perform meticulous inspections, and the like.

The benefits from the "rigid" attachment mechanism are many and result in much higher productivity and at significant cost savings while providing a safer working environment. For instance, applications that involve hard to access locations are especially well suited for the UAV system with at least one attachment mechanism according to the present invention. The UAV system can also eliminate the need for workers to use ladders and lifts with the supporting safety equipment for elevated access points. The UAV system can also work in elevated temperatures and in harmful and/or poisonous atmospheric conditions without endangering humans. Therefore, the costs and reduced and quicker access and shorter downtimes in production result. The following is a brief list of potential applications where safety and cost savings of the present UAV system are possible:

1.) Boiler Inspections—The inspection of boilers is an ideal application because the access to the boiler is very limited, mobility within is equally limited, and hot gases are present that must be vented prior to human inspections. Inspections and sensor types include visual, thermal, ultrasonic, and others.

2.) Material Inspections—The ability to attach will allow for much greater details to be observed through increased zoom and pointing capabilities for visual/optical/infrared/etc. sensors due to the stable, perched UAV platform. The flight system induces blur from the motion of the UAV and the vibration of motors and rotors when in operation.

3.) Remote Monitoring—This is another ideal application where a select area is to be monitored for an extended period of time without installing permanent equipment. The ability to conduct temporary surveillance from multiple locations for extended periods would be a tremendous asset in many applications.

4.) Air Flow Measurements—Flow measurements are often needed for heating and ventilation systems to be balanced. Without the flight system operational (i.e. without blades/props spinning), a UAV system can be used to gather flow information without the need for ladders and lifts to access the air handling systems.

5.) Repair Operations—It is expected that repair operations at hard-to-access points would occur. This could include such things as simple welding operations or changing of light bulbs.

6.) Other Applications—A huge number of additional applications would benefit from the ability to conduct robotic operations from a substantially rigid platform/base.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aerial vehicle system comprising:
   a flight system configured to generate propulsive force and lift;
   a protective framework, wherein the flight system is at least partially enclosed by the protective framework; and
   an attachment mechanism secured to the protective framework and configured to selectively attach to a structure to provide stable perching of the aerial vehicle system, wherein the attachment mechanism is an electro-permanent magnet device comprising:
      a permanent magnet and;
      an electromagnet positioned adjacent to the permanent magnet.

2. The system of claim 1, wherein the protective framework comprises:
   a connector; and
   a plurality of rods attached to the connector, wherein the plurality of rods defines an outer boundary of the protective framework having a substantially spheroid shape.

3. The system of claim 2, wherein the flight system comprises a plurality of rotor blades in a coaxcopter configuration, and wherein the plurality of rotor blades is located entirely within the outer boundary of the protective framework.

4. The system of claim 1 and further comprising:
a deployable system supported relative to the flight system and comprising:
a sensor located within an outer boundary of the protective framework; and
a robotic arm capable of extending to locations outside an outer boundary of the protective framework.

5. The system of claim 1, wherein the flight system includes an automated control subsystem configured for unmanned flight.

6. The system of claim 1, wherein the attachment mechanism is secured directly to the protective framework at or near an outer boundary defined by the protective framework.

7. The system of claim 1, wherein the protective framework further comprises:
a frame made of a cellular composite material, wherein the frame is substantially planar; and
a plurality of rods attached to the frame.

8. The system of claim 1, wherein the flight system is positioned within one or more openings in the frame.

9. The system of claim 1, wherein an electromagnet of the electro-permanent magnetic device is configured to be temporarily powered to negate a magnetic attractiveness of a permanent magnet of the electro-permanent magnetic device.

10. The system of claim 1, wherein an electromagnet of the electro-permanent magnetic device is configured to be temporarily powered to bolster a magnetic attractiveness of a permanent magnet of the electro-permanent magnetic device.

11. The system of claim 1, wherein the electromagnet at least partially surrounds the permanent magnet.

12. A method of operating an aerial vehicle, the method comprising:
flying the aerial vehicle to a perching location, wherein the aerial vehicle comprises a flight system configured to generate propulsive force and lift;
a protective framework, wherein the flight system is at least partially enclosed by the protective framework; and
an attachment mechanism secured to the protective framework and configured to selectively attach to a structure to provide stable perching of the aerial vehicle system, wherein the attachment mechanism is an electro-permanent magnet device comprising:
a permanent magnet and;
an electromagnet;
magnetically attracting the aerial vehicle to a perch with the permanent magnet magnetic field to create a perching engagement between the aerial vehicle and the perch;
generating an opposing magnetic field with the electromagnet, wherein the opposing magnetic field cancels out at least a portion of the permanent magnetic field; and
disengaging the aerial vehicle from the perch.

13. The method of claim 12, wherein the step of generating the opposing magnetic field is performed while the aerial vehicle is flying.

14. The method of claim 12, wherein the step of generating the opposing magnetic field is performed while the aerial vehicle is perched.

15. The method of claim 12 and further comprising:
placing a flight system of the aerial vehicle in a low power mode when the aerial vehicle is magnetically attracted to the perch in the perching engagement, wherein rotor blades of the flight system are idle in the low power mode.

16. The method of claim 15 and further comprising:
performing an operation with a deployable system carried onboard the aerial vehicle while the flight system is in the lower power mode.

17. The method of claim 15 and further comprising:
powering the flight system to rotate the rotor blades of the flight system; and
flying the aerial vehicle away from the perching location.

18. The method of claim 12, wherein the perching engagement supports the entire aerial vehicle in a stable relationship relative to the perch.

19. The method of claim 12, wherein the perching engagement is maintained passively through the use of the permanent magnet magnetic field.

20. The method of claim 12 and further comprising:
generating an auxiliary magnetic field that bolsters the permanent magnet magnetic field to create the perching engagement; and
ceasing generation of the auxiliary magnetic field after the perching engagement is stable.

* * * * *